United States Patent [19]

Wakana

[11] Patent Number: 5,128,165
[45] Date of Patent: Jul. 7, 1992

[54] POWDER MIXTURE FOR HEALTHY FOODS AND METHOD FOR PRODUCING CAKES THEREFROM

[75] Inventor: Seiko Wakana, Tokyo, Japan
[73] Assignee: Goyoco., Ltd., Japan
[21] Appl. No.: 668,483
[22] Filed: Mar. 13, 1991
[51] Int. Cl.5 .......................... A21D 13/04; A23L 1/20
[52] U.S. Cl. ..................................... 426/550; 426/634
[58] Field of Search ................................ 426/550, 634

[56] References Cited

U.S. PATENT DOCUMENTS

| | | | |
|---|---|---|---|
| 4,642,241 | 2/1987 | Noguchi | 426/516 |
| 4,668,519 | 5/1987 | Dartey et al. | 426/804 |
| 4,702,927 | 10/1987 | Hirotsuka et al. | 426/518 |

*Primary Examiner*—Jeanette Hunter
*Assistant Examiner*—Mary S. Mims
*Attorney, Agent, or Firm*—Lerner, David, Littenberg, Krumholz & Mentlik

[57] ABSTRACT

In production of healthy food cakes, okara taken as a by-product in production of tofu, i.e. bean curd, is used in dried powder state in mixture with baking powder, fluid eggs and other ingredients such as powdered vegetables, powdered fruits and flavors. Inclusion of okara in the composition assures high degree of digestibility and nutrition with economic utilization of a refuse which has not been regarded in the field of industrial application all that long.

4 Claims, No Drawings

POWDER MIXTURE FOR HEALTHY FOODS AND METHOD FOR PRODUCING CAKES THEREFROM

BACKGROUND OF THE INVENTION

The present invention relates to powder mixture for healthy foods and method for producing cakes therefrom, and more particularly relates to powder mixture containing okara as its major ingredient and used for production of various cakes as healthy foods.

Okara is a by-product obtained in production of tofu, i.e. bean curd, which is one of the most popular, traditional Japanese foods. More specifically, in production of tofu, beans swollen with water are ground into colloidal paste which is then heated and filtered. An extract from this filtering process is shaped into tofu after addition of proper coagulating agent such as calcium sulfate. Okara is obtained as a refuse after the filtering process.

Tofu is widely accepted as a very nutritious food with high degree of digestibility (about 98%). It generally contains about 6% by weight of vegetable protein, about 4% by weight of fats and only 0.8 to 1.7% by weight of sugar. Its appreciable content of vegetable protein associated with low content of sugar has recently developed its consumption in particular in the field of healthy foods. Though a little degraded, okara, i.e. bean curd refuse, is also believed to be appreciably nutritious and digestible. Despite such merits, okara has not been regarded in the field of industrial application all that long. In only minor part of production, okara has been used for home cooking and most part of animal foods or, in the worst case, discarded as a waste.

SUMMARY OF THE INVENTION

It is the object of the present invention to utilize okara for industrial application which has long been disregarded in production of healthy foods.

In accordance with one aspect of the present invention, powder mixture contains, as its major ingredients, dried okara powder and baking powder.

In accordance with another aspect of the present invention, method for producing cakes comprises the steps of preparing powder mixture containing at least dried okara powder and baking powder, adding fluid eggs to this powder mixture to form colloidal paste and baking the colloidal paste.

DESCRIPTION OF PREFERRED EMBODIMENTS

In preparation of okara powder, okara obtained as a refuse after the above-described filtering process is dried and milled into powder state. This dried okara powder is then mixed with baking powder. Preferably 50 to 90% by weight of dried okara powder is mixed with 1 to 15% by weight of baking powder. A small amount of salt is generally added too. Depending on the end use as cakes, powdered vegetables such as dried powder nuts and dried pumpkin powder, powdered fruits such as dried apple powder, powdered tee such as Japanese tee powder, and flavors may be added solely or in combination.

Next, fluid eggs are added to the powder mixture so prepared. Generally, egg yolks mixed with honey etc. are stirred into a bubbling sate to form the fluid eggs.

The powder mixture and the fluid eggs are mixed to form colloidal paste. Depending on end use, the above-described ingredients may be selectively added. The colloidal paste is poured into shapes for subsequent baking.

EXAMPLE 1

In preparation of the powder mixture, 0.5 g of salt, 25 g of baking powder, 7809 g of powdered cocoa and 100 g of powdered nuts were added 180 g of dried okara powder and the obtained powder mixture was then wetted via addition of 150 cc of cow milk. Separately, 18 egg yolks were mixed with 250 g of sugar and 2 spoonful of honey and the mixture was stirred furiously in a bubbler to form fluid eggs. The powder mixture, the fluid eggs, 300 g of butter and 3 spoonful of brandy were mixed to form colloidal paste. After pouring into square shapes, the colloidal paste was baked for about 20 min at about 170° C. Spongy cakes with cocoa flavor were obtained.

EXAMPLE 2

In preparation of powder mixture, 0.5 g of salt, 25 g of baking powder and 70 g of powdered pumpkin were added to 180 g of dried okara powder. The powder mixture was then wetted with 150 cc of cow milk. Separately, 18 egg yolks were mixed with 200 g of sugar and 3 spoonful of honey and the fluid eggs thus obtained was stirred furiously in a bubbler. The fluid eggs so prepared was mixed with the powder mixture, 300 g of butter and 3 spoonful of brandy to form colloidal paste which was then poured into square shapes for subsequent baking at about 170° C. for about 20 min. Spongy cakes of pumpkin taste were obtained.

EXAMPLE 3

In preparation of powder mixture, 0.5 g of salt, 25 g of baking powder and 2 spoonful of powdered Japanese tee were added to 180 g of dried okara powder and the powder mixture was wetted via addition of 150 cc of cow milk. 16 egg yolks were mixed with 240 g of sugar and 3 spoonful of honey and the mixture was stirred furiously in a bubbler. The fluid eggs were next mixed with the powder mixture, 300 g of butter, 70 g of boiled adzuki beans and 3 spoonful of brandy to form colloidal paste. The colloidal paste in shapes was baked at about 170° C. for about 20 min to obtain cakes of tee flavor.

EXAMPLE 4

In preparation of powder mixture, 1 g of salt and 25 g of baking powder was added to 180 g of dried okara powder and the powder mixture was wetted with 150 cc of cow milk. 16 egg yolks were mixed with 200 g of sugar and 3 spoonful of honey and stirred furiously in a bubbler to form fluid eggs. Next, the powder mixture, the fluid eggs, 300 g of butter, 180 g of cream cheese. 3 spoonful of brandy and one grated lemon skin were mixed together to form colloidal mixture which was then baked at about 170° C. for about 20 min. Cakes of cheese taste were obtained.

EXAMPLE 5

In preparation of powder mixture, 0.5 g of salt and 25 g of baking powder were added to 180 g of dried okara powder and the powder mixture was wetted with 150 cc of cow milk. 18 egg yolks were mixed with 240 g of sugar and 3 spoonful of honey and obtained fluid eggs were stirred furiously in a bubbler. The powder mixture, the fluid eggs and 150 g of grated and squeezed carrot were mixed to form colloidal paste which was then baked at about 170° C. for about 20 min. Spongy cakes with carrot flavor were obtained.

In accordance with the present invention, inclusion of okara in the material assures production of very spongy, healthy and digestible cakes of various flavors in an industrial scale with low cost of production resulted from utilization of okara which has been quite disregarded in the field of industrial application.

I claim:

1. A method for producing baked goods comprising the steps of: preparing a powder mixture including at least dried okara powder in an amount of between about 50% and 90% based on the weight of the powder mixture and baking powder in an amount of between about 1% and about 15% based on the weight of the powder mixture, adding fluid egg to said powder mixture in an amount of between about 300 to about 500 parts by weight of said fluid eggs for about every 100 parts by weight of said powder mixture to form a colloidal mixture and, baking said colloidal mixture.

2. A prepared food product produced from a colloidal paste, comprising: dried okara powder in an amount of between about 50% and about 90% by weight of the dried non-flavor ingredients; baking powder in an amount of between about 1% and about 15% by weight of the dried non-flavor ingredients; and fluid egg wherein said fluid egg is present in a ratio of about 3:1 to about 5:1 based on the amount of said dried okara powder.

3. The prepared food product from a colloidal paste of claim 2 further comprising at least one flavor.

4. The prepared food product from a colloidal paste of claim 3 wherein said flavor is selected from the group consisting of sugar, honey, cocoa, vegetables, fruits, butter, liquor, and a tea.

* * * * *

UNITED STATES PATENT AND TRADEMARK OFFICE
CERTIFICATE OF CORRECTION

PATENT NO. : 5,128,165

DATED : July 7, 1992

INVENTOR(S) : Wakana

It is certified that error appears in the above-identified patent and that said Letters Patent is hereby corrected as shown below:

Column 1, line 33, "of" should read --for--.
Column 2, line 7, "7809" should read --709--.

Signed and Sealed this

Third Day of August, 1993

Attest:

MICHAEL K. KIRK

Attesting Officer

Acting Commissioner of Patents and Trademarks